United States Patent [19]

Shivanandan

[11] Patent Number: 5,302,830
[45] Date of Patent: Apr. 12, 1994

[54] METHOD FOR MEASURING THERMAL DIFFERENCES IN INFRARED EMISSIONS FROM MICRO DEVICES

[75] Inventor: Kandiah Shivanandan, Bethesda, Md.

[73] Assignee: General Research Corporation, Vienna, Va.

[21] Appl. No.: 26,599

[22] Filed: Mar. 5, 1993

[51] Int. Cl.$^5$ .............................................. G01N 21/88
[52] U.S. Cl. .................................. 250/342; 250/332; 250/349
[58] Field of Search ....................... 250/342, 349, 332

[56] References Cited

PUBLICATIONS

White et al., "Observation of Carrier Densities in Silicon Devices by Infrared Emission", J. Phys.: Sci Instrum., vol. 10, pp. 817–825, 1977.
Peter E. Cottrell, et al., "Hot-Electron Emission in N-Channel IGFET's," IEEE Transactions on Electron Devices, vol. ED-26, No. 4, pp. 520–533 (Apr. 1979).
T. Aoki and A. Yoshii, "Analysis of Latchup-Induced Photoemission," IEDM Technical Digest, pp. 281–284 (1989).
Akira Torumi, et al., "Experimental Determination of Hot-Carrier Energy Distribution and Minority Carrier Generation Mechanism Due to Hot-Carrier Effects," IEDM Technical Digest, pp. 56–59 (1985).
Akira Torumi, et al., "A Study of Photon Emission from N-Channel MOSFET's," IEEE Transactions On Electron Devices, vol. ED-34, No. 7, p. 1501 (Jul. 1987).
N. Tsutsu, et al., "New Detection Method of Hot-Carrier Degradation Using Photon Spectrum Analysis of Weak Luminescence of CMOS VLSI," IEEE International Conference on Semiconductors, Mar. 1990, San Diego, CA.
N. Khurana, "Pulse Infra-red Microscopy For Debugging Latch-up on CMOS Products," IEEE International Reliability Physics, pp. 122–127 Apr. 1984.
James T. Woolaway, "New Sensor Technology for the 3- to 5-μm Imaging Band," Photonics, vol. 25, Issue 2, pp. 113–119 (Feb. 1991).
Simon Tam, et al., "Hot-Electron-Induced Photon and Photocarrier Generation In Silicon MOSFETs," IEEE Transactions on Electron Devices, vol. ED-31, No. 9, pp. 1264–1273 (Sep. 1984).
A. G. Chynoweth and K. G. McKay, "Photon Emission from Avalache Breakdown in Silicon," Physical Review, vol. 102, No. 2, pp. 369–376 (Apr. 1956).
R. Newman et al., "Visible Light from a Si p–n Junction," Phys. Rev. 98, p. 1536 (1955).
Y. Uraoka et al., "Evaluation Technique of Gate Oxide Reliability With Electrical and Optical Measurements," IEEE 1989 Int. Conference on Microelectronic Test Structures, pp. 97–102, vol. 2, No. 1 (Mar. 1989).
N. Khurana and C. L. Chiang, "Analysis of Product Hot Electron Problems By Gated Emission Microscopy," 1986 IEEE/IRPS, pp. 189–194.
T. H. Ning et al., "Emission probability of hot electrons from silicon into silicon dioxide," J. Apply. Phys., pp. 286–293, vol. 48, No. 1 (Jan. 1977).

Primary Examiner—Carolyn E. Fields
Attorney, Agent, or Firm—Finnegan, Henderson, Farabow, Garrett and Dunner

[57] ABSTRACT

A method for measuring thermal differences in infrared emissions from semiconductors, the method utilizing an image sensor including an array detector having a plurality of detector elements which produce signals corresponding to semiconductor radiation emission focused thereupon by an optical lens system. At least one bandpass filter is utilized to substantially filter that portion of the semiconductor radiation emission having wavelengths greater than 5 micrometers. The detector element signals are processed to identify performance degrading phenomena occurring in the semiconductor device.

20 Claims, 3 Drawing Sheets

METHOD FOR MEASURING THERMAL DIFFERENCES IN INFRARED EMISSIONS FROM MICRO DEVICES

BACKGROUND OF THE INVENTION

1. Field of the Invention

The present invention relates generally to a method for measuring thermal differences in infrared emissions from micro devices, and more particularly to a method for measuring thermal differences in infrared emissions from semiconductors to detect and locate defects therein.

2. Background of the Invention

It is known that certain physical phenomena, occurring within micro devices such as semiconductor devices, contribute to degradation of the device's performance under various operating conditions. Such phenomena are known to occur, for example, within insulated-gate field-effect transistors (IGFETS), metal oxide semiconductor field-effect transistors (MOSFETS), and virtually all semiconductor devices containing p-n junctions.

MOSFETS are a type of semiconductor device widely applied in large-scale integration, particularly in implementing large random access high-speed memories for computers. One type of phenomena that may contribute to degradation in the performance of MOSFETS is the emission of hot electrons from the MOSFET's silicon substrate into the gate insulator layer under various bias conditions. See generally P. Cotrell, R. Troutman, and T. Ning, "Hot-Electron Emission in N-Channel IGFET's", IEEE Trans. on Electron Devices, Vol. ED-26, pp. 520-33 (1979). It is believed that the resulting substrate current may, in turn, overload the substrate-bias voltage, causing substrate potential fluctuations or electron injection into the substrate, inducing snap-back breakdown and CMOS latchup. Another type of phenomena causing degradation in performance of MOSFETS is believed to be caused by electron trapping in the oxide. Id.

P-n junctions are widely used in various types of semiconductor devices. P-n junctions are formed by placing a p-type semiconductor material adjacent to an n-type semiconductor material, and have the property of blocking the flow of current in one direction while allowing it to pass in the other direction. It is known that certain physical phenomena contribute to breakdown across a p-n junction upon the application of reverse bias. See generally A. Chynoweth and K. McKay, "Photon Emission from Avalanche Breakdown in Silicon", Phys. Rev., Vol. 102, pp. 369-76 (1956). In many cases, such breakdown is undesirable.

The occurrence of these and other undesirable physical phenomena, within semiconductor devices, are known to be accompanied by the emission of electromagnetic radiation. For example, photon emission spectrum characteristics resulting from latchup and hot electrons in n-channel MOSFETS have been measured in the visible spectrum. See, e.g., T. Aoki and A. Yoshii, "Analysis of Latchup-Induced Photoemission", IEDM Technical Digest 89-281, pp. 281-84 (1989). Moreover, emission spectrum characteristics from forward and reversed biased p-n junction diodes have also been measured in the visible spectrum. See A. Chynoweth and K. McKay, "Photon Emission from Avalanche Breakdown in Silicon", Phys. Rev., Vol. 102, pp. 369-76 (1956). These emissions are believed to be generated by Bremsstrahlung radiation, i.e., broad band radiation emission when an energetic electron is decelerated in an electric field.

It is highly desirable to measure the electromagnetic radiation emitted from semiconductors to determine whether the aforementioned and other undesirable phenomena contributing to degradation of performance are occurring or may occur under certain operating conditions. It is also desirable to spatially locate from where, within the micro device, the radiation is emitted. Detections of such radiation emission, by measuring the "thermal signature" of the device, can form the basis for testing failure mechanisms in semiconductor devices, and can be used to detect defects in individual semiconductors or locate problems in various manufacturing processes. Moreover, such measurement can be utilized to predict failures in semiconductors and to improve overall design.

Most failures of semiconductor devices will be accompanied by abnormal thermal signatures, e.g., some devices might become very hot while some might never turn on when powered up. The change in thermal signature due to the failure mechanism, however, may be difficult to view, due to operating temperature, small thermal gradient, or small device size.

In the past, measurements of such electromagnetic radiation emissions from semiconductors have been performed in the visible spectrum. This basic technology has now evolved into photoemission microscopy and is being utilized in the private sector in testing failure mechanisms in semiconductor devices.

It is desirable, however, to measure radiation emissions in other wavelengths of the electromagnetic spectrum. This will provide a more complete spectral analysis of the emitted radiation and thermal signatures in semiconductor devices that result from failure mechanisms, thus providing additional test data. Moreover, the applicant believes that certain undesirable phenomena produce infrared radiation, but do not generate radiation in the visible spectrum. Therefore, detection of such phenomena cannot be accomplished using measurements limited solely to the visible spectrum.

The measurement of infrared radiation emission from micro devices, however, is difficult because substantial infrared background radiation is emitted from all objects at or near room temperature. Moreover, some failed devices with abnormal thermal signatures generate large amounts of infrared background radiation. The applicant believes that no practical method currently exists to measure thermal differences in infrared emissions from micro devices with adequate sensitivity, resolution, frame speed, and measurement accuracy.

SUMMARY OF THE INVENTION

The general object of the invention is to provide a method for measuring the thermal differences in infrared emissions from micro devices, the method being capable of measuring small changes in temperature of the infrared radiation in the presence of strong background radiation.

Additional objects and advantages of the invention will be set forth in part in the description which follows, and in part will be obvious from the description, or may be learned by practice of the invention. The objects and advantages of the invention will be realized and attained by means of the method steps and combinations particularly pointed out in the appended claims.

To achieve the objects and in accordance with the purpose of the invention, as embodied and broadly described herein, the invention utilizes an array detector capable of detecting and measuring electromagnetic radiation in the infrared spectrum. The array detector comprises a two dimensional arrangement of detector elements, each detector element or "pixel" producing a electronic signal functionally corresponding to the infrared radiation that is incident upon the detector element. By use of this multi-pixel array detector, the image sensor can utilize time delay and signal integration over a fixed period of time to improve the resulting signal-to-noise ratios, while still maintaining an adequate frame rate. The use of integration over a fixed period of time while still maintaining an adequate frame rate is possible because numerous pixels operate simultaneously.

To further achieve the objects and in accordance with the purpose of the invention, the invention utilizes several band pass filters to limit the wavelength range of radiation incident upon the array detector to radiation with wavelengths below about 5 micrometers. The applicant believes that the infrared background photon flux radiance intensity corresponding to a room temperature background temperature is substantially lower for wavelengths less than 5 micrometers. Therefore, by limiting the incident radiation to below 5 micrometers, significantly less total background radiation is incident upon the array detector, thus improving signal-to-noise ratios. Moreover, because significantly less total background radiation is incident upon each individual detector, each detector will operate significantly below its saturation point, thus improving quantum efficiency and further improving signal-to-noise ratios.

To further achieve the objects and in accordance with the purpose of the invention, the invention uses a chopper which modulates, i.e., interrupts at regular intervals, the radiation incident upon the array detector. By modulating the incident radiation at regular intervals, each detector will operate at a point well below its saturation point, thus further improving quantum efficiency and further improving signal-to-noise ratios.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
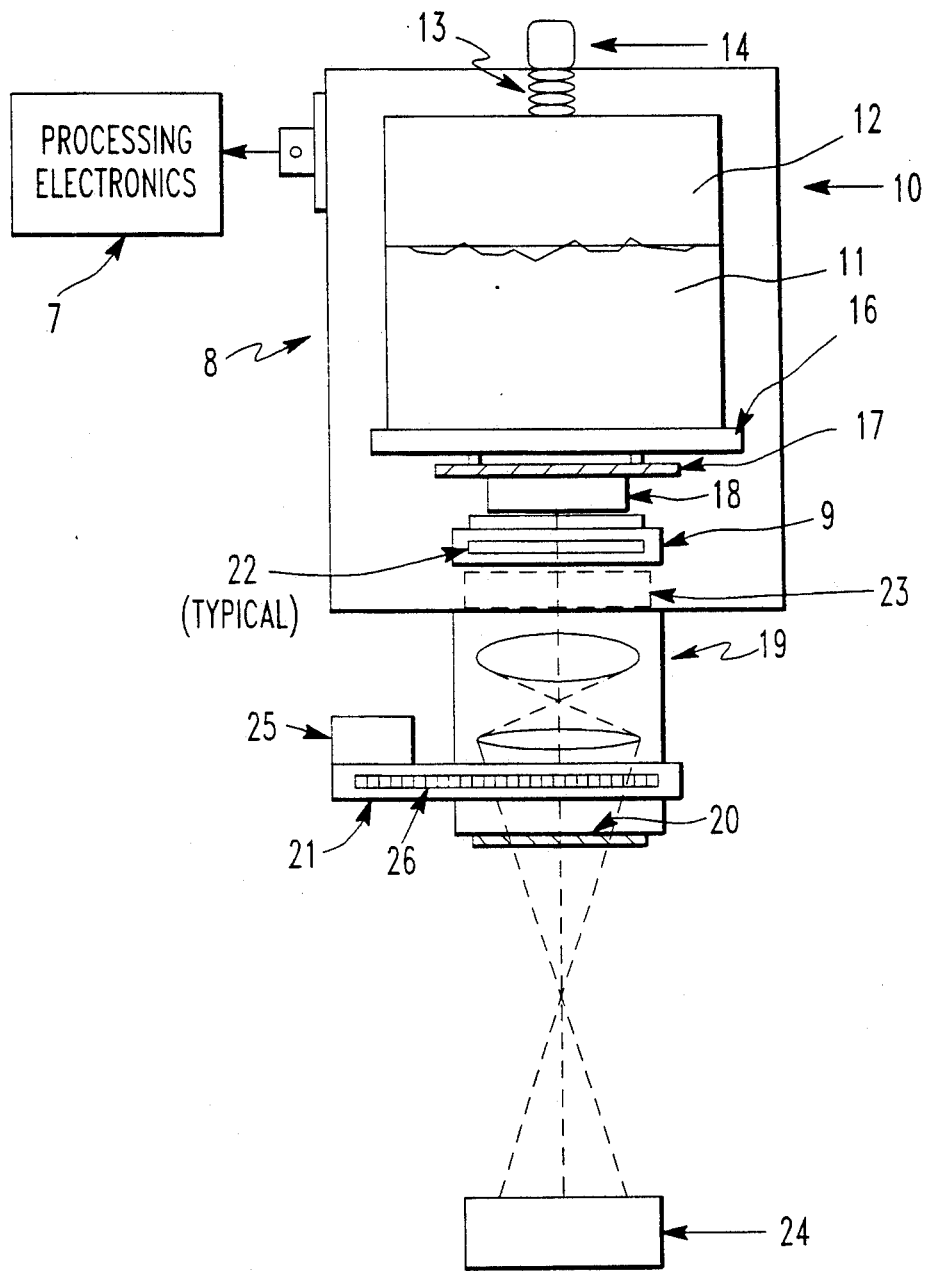
FIG. 1 is an elevation view, partially in schematic form, of an image sensor to be utilized in accordance with the preferred embodiment of the invention.

In a preferred embodiment of the present invention, an infrared image sensor 8 is used for measuring thermal differences in an electromagnetic radiation emission from a micro device, as shown in FIG. 1. In accordance with the method of the invention, the image sensor 8 includes a dewar 10 having a cavity 12 therein for containing liquid nitrogen 11. The dewar 10 has an opening 13, sealable by plug 14 to prevent evaporation. The opening 13 is provided to allow the introduction of liquid nitrogen 11 into the cavity 12. A cold surface 16 is located at the base of cavity 12 to provide good thermal conductivity between the liquid nitrogen 11 and components in contact with the cold surface 16.

Further in accordance with the method of the invention, the image sensor 8 includes an array detector 18 for detecting electromagnetic radiation. The array detector 18 is a two dimensional arrangement of a plurality of detector elements, each of the detector elements constituting one pixel of the array detector. In operation, each detector element simultaneously generates a signal functionally corresponding to the incident radiation focused thereupon.

Use of a two dimensional array detector provides many advantages over a single dimension or single pixel "scanning" type detector. For example, because many pixels operate simultaneously in the two dimensional array detector, the image sensor can utilize time delay and signal integration techniques over a relatively long fixed period of time to improve signal-to-noise ratios, while still maintaining an adequate frame rate. The use of such integration will allow improved measurements of weak infrared emissions in the presence of strong background radiation. For example, under similar operating conditions, an array detector having 65,536 pixels can achieve 100 times the frame rate of a single detector scanning-type image sensor, while allowing integration over a fixed period over 600 times longer than the integration period of a single detector scanning type image sensor.

Typical arrangements of detector elements in array detectors include 128×128 pixels, and 256×256 pixels. The choice of the arrangement depends upon a number of design considerations which vary according to the proposed application of the infrared image sensor. Such design considerations include, among others, cost, desired field of view, spatial resolution, and frame speed of the image sensor. Preferably, however, a large array detector 18 such as a 256×256 pixel arrangement is utilized in the method of the present invention to achieve long integration time, improved signal-to-noise ratio, large field of view, high spatial resolution, and adequate frame speed.

The image sensor 8 is intended to measure infrared radiation with wavelengths of less than about five micrometers. Several types of commercially available array detectors are known to be suitable for measurement of infrared radiation at these wavelengths. These array detector types include indium antimonide (InSb), mercury cadmium telluride (HgCdTe), and platinum silicide (PtSi). Each type has different application considerations including cost, pixel uniformity and produceability, and quantum efficiency. Preferably, the array detector 18 is an indium antimonide type array detector. This type of array detector is commercially available in large formats such as 256×256 pixels, has very good uniformity from pixel to pixel, and has a flat response over a 1–5 micrometer wave band. It is contemplated that the array detector 18 will operate at a temperature of less than approximately 77 degrees Kelvin. The array detector 18 is thus located near the cold surface 16, so that heat from the array detector 18 is transferred through the cold surface 16 to the liquid nitrogen 11.

Further in accordance with the method of the invention, image sensor 8 includes an optical lens system 19 for focusing electromagnetic radiation emissions from a micro device 24 under test onto the array detector 18. Various types of optical lens systems are well know to those skilled in the art. The applicant believes that substantial background radiation can be generated by the room temperature optical elements themselves. Therefore, to reduce background radiation and to improve signal-to-noise ratios, preferably, the optical lens system 19 is comprised of multi-element cooled optics for maximum sensitivity. Suitable materials for lenses include zinc selenide (ZnSe), calcium fluoride (CaF2), and zinc sulfide (ZnS), which are well known optical materials. Preferably, the optical lens system 19 is also located as near as possible to the cold surface 16, so that heat from the optical lens system 19 is transferred through the cold surface 16 to the liquid nitrogen 11.

The applicant believes that diffraction will limit the ultimate spatial resolution of the image sensor as it views the micro device 24 under test. An optical lens system with large lenses is therefore preferable to minimize diffraction. The practical size of the lenses, however, is limited by cost and availability. A 50 millimeter diameter lens is suitable for use in the present invention.

Still further in accordance with the method of the invention, image sensor 8 also includes an optical window 20. The optical window 20, which provides a vacuum seal at the entrance of the optical lens system 19, should also provide good in-band transmission for the wavelength of radiation to be measured, namely, infrared radiation having wavelengths less than 5 micrometers. Additionally, the residual absorption of the optical window 20 should be low in this region to assure that thermal emission of background radiation is minimal, thus improving signal-to-noise ratios. Moreover, to reduce loss of incident radiation at the window, the window is preferably coated with a well known antireflective coating, such as calcium fluoride (CaF2), sapphire, and zinc selenide (ZnSe).

Figure 2:
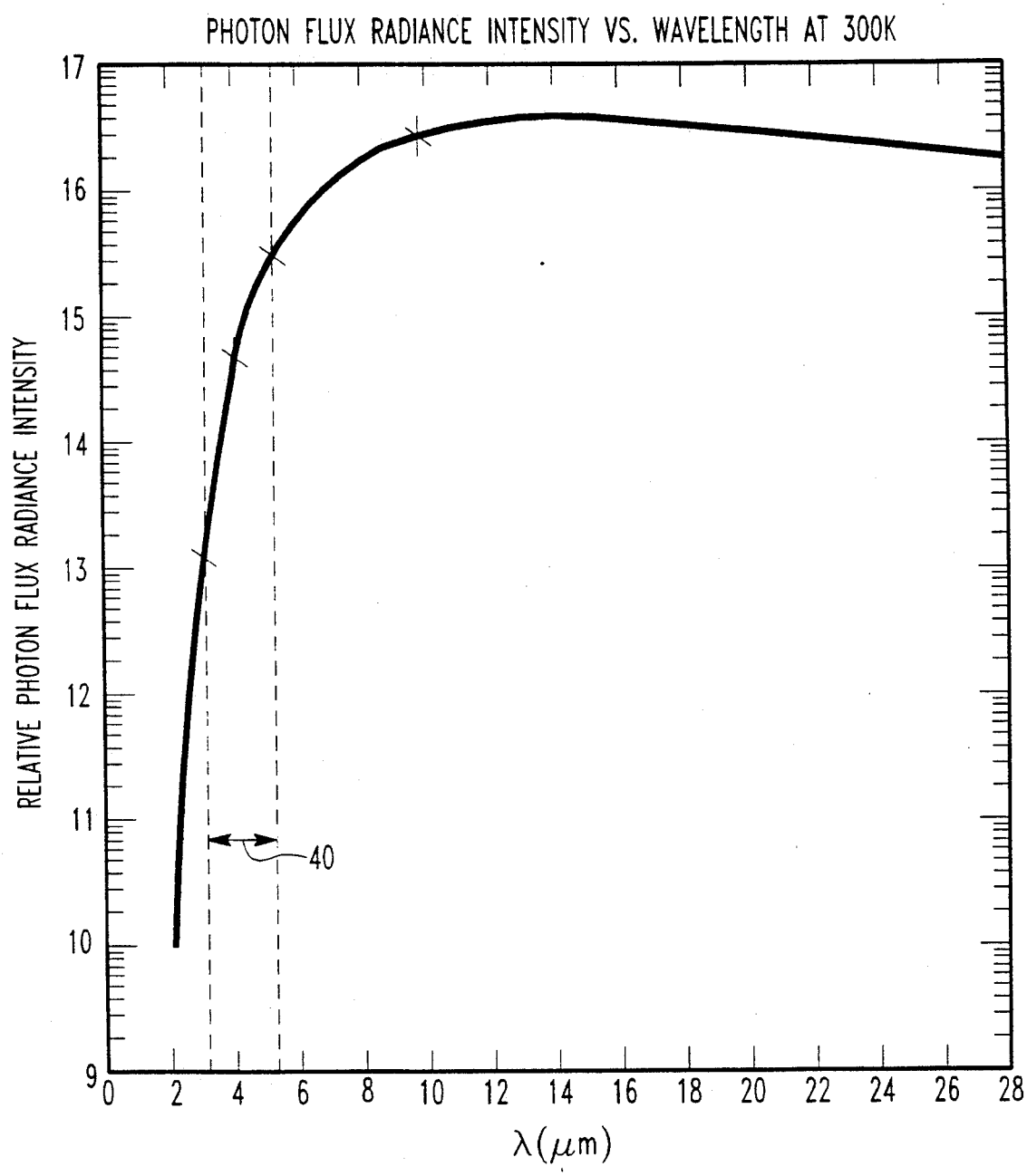
FIG. 2 is a graph of photon flux radiance intensity v. wavelength of the photon flux for a background temperature of 300 degrees Kelvin.

Further in accordance with the method of the invention, image sensor 8 also includes a cold shield 23 to baffle stray background radiation. It is known that any object of a temperature greater than zero degrees Kelvin emits background radiation. It is further known that the distribution of this background radiation is a function of the temperature of the object. Therefore, the micro device 24 will emit background radiation. For example, the applicant believes that a semiconductor, at room temperature (approximately 300 degrees Kelvin), will emit infrared radiation, with a relative spectral distribution of background radiation as illustrated in FIG. 2

The relative background radiation photon flux intensity for wavelengths less than 5 micrometers is substantially less than the background radiation photon flux intensity for wavelengths greater than 5 micrometers. Therefore, to minimize background radiation from the micro device 24 under test and to improve signal-to-noise ratios of radiation emission measurements, the present invention includes bandpass filters 22 for filtering the electromagnetic emissions of the micro device 24 to substantially eliminate that portion of the emission having wavelengths greater than 5 micrometers. Moreover, additional advantages are attained by filtering the radiation. For example, because significantly less total background radiation is incident upon each individual detector, each detector will operate at a point well below its saturation point, thus improving quantum efficiency and further improving signal-to-noise ratios. Furthermore, longer integration times are possible without saturation or near saturation of the detector elements.

Another purpose of the bandpass filters 22 is to limit the radiation incident upon the array detector 18 to a narrow band. By performing and combining measurements using a variety of bandpass filters 22 with different absorption characteristics, a true spectral distribution of the infrared radiation emission from the micro device 24 can be determined.

In the preferred embodiment of the present invention, it is intended that 5 bandpass filters will be used to attain the aforementioned objectives. Preferably, the bandpass filters 22 are a well known type of narrow-band filter, and are located near the cold surface 16, so that heat from the bandpass filters is transferred through the cold surface 16 to the liquid nitrogen 11, to reduce background radiation and improve signal-to-noise ratios. The bandpass filters 22 are contained in a filter wheel 9 that permits the remotely selective positioning of the bandpass filters 22 into or out of the path of the radiation. Preferably, the filter wheel 9 is driven by a remotely controlled motor (not shown).

Still further in accordance with the method of the invention, the image sensor 8 also includes a chopper 21 which modulates, i.e., interrupts at regular intervals, the radiation incident upon the array detector. By modulating the incident radiation at regular intervals, each detector will operate at a point well below its saturation point, thus improving the quantum efficiency of the detector and improving signal-to-noise ratios. Preferably, the chopper 21 comprises an apertured disc or circular blade 26 driven by a precision electric motor 25. The apertured disc or circular blade 26 is placed in the path of radiation emission from the micro device 24 under test to the detector array 18. By driving the apertured disc or circular blade 26 at a fixed rotation speed, the radiation emissions from the micro device 24 are modulated at regular intervals.

Figure 3:
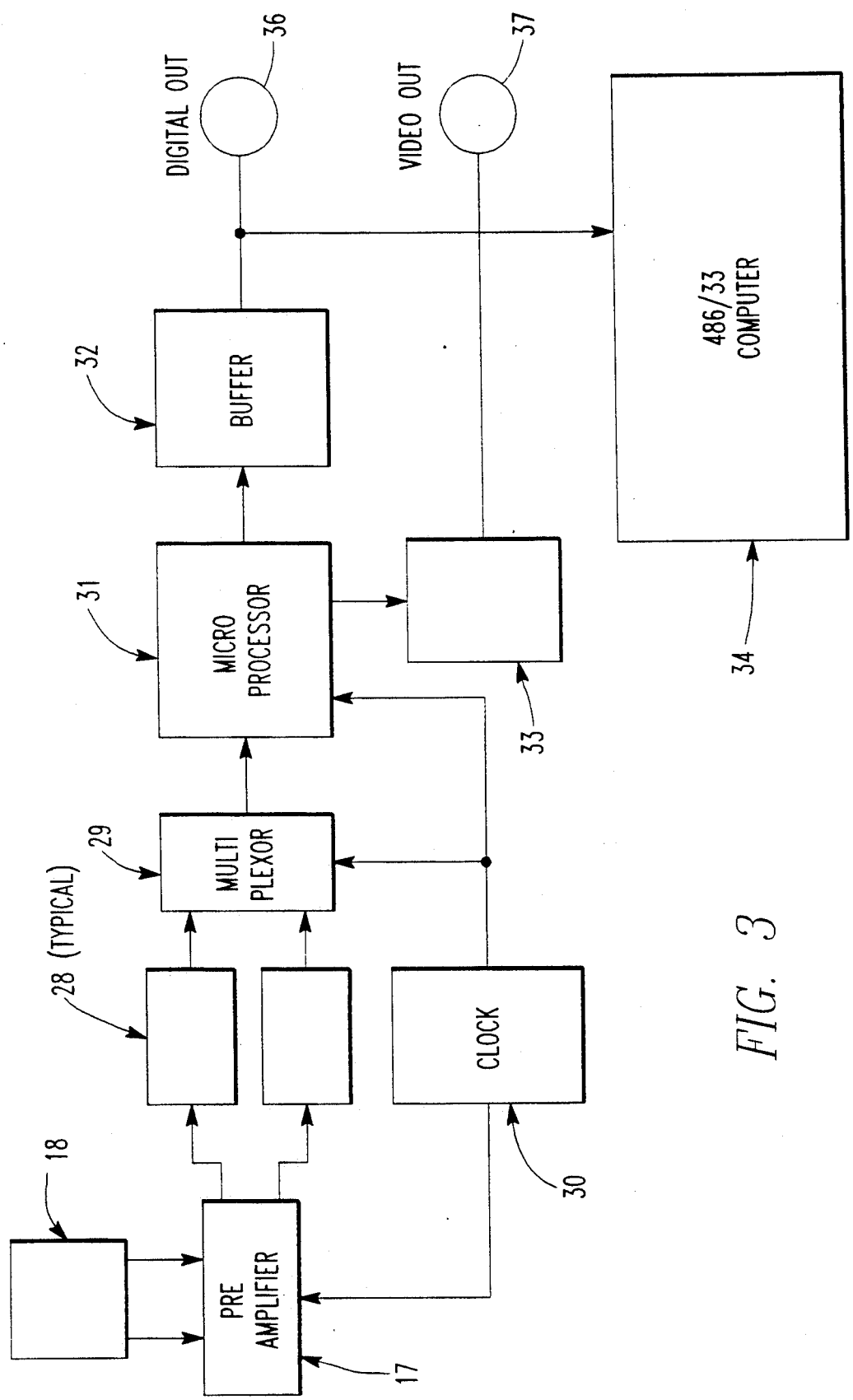
FIG. 3 is a schematic block diagram of an electronic processing circuit to be utilized in accordance with the preferred embodiment of the invention.

Still further in accordance with the method of the invention, an electronic signal processor 7 is used for converting the signals produced by the detector elements into numeric data. The electronic signal processor 7 is shown in greater detail in FIG. 3. The electronic signal processor 7 includes a preamplifier 17 for amplifying the signals produced by the detector elements. Preferably, the preamplifier 17 is located closely adjacent to the array detector, as seen in FIG. 1, to prevent the addition of stray electronic noise to the unamplified signals.

The electronic signal processor 7 further includes a plurality of analog to digital converters 28 to convert the amplified signals from the preamplifier 17 into digital data. The digital data is then transmitted to a microprocessor 31 via a multiplexer 29. Preferably, the multiplexer 29 is a time division multiplexer, controlled by a clock generator 30. In the microprocessor 31, the digital signals are transformed into numeric data utilizing various types of well known algorithms and statistical analyses.

Depending on the desired display of the measurement data from the infrared image sensor 8, the numeric data output from the electronic signal processor can be fed to a video converter 33 for output to a video jack 37. Alternatively, the numeric data output from the microprocessor 31 can be transmitted to a storage buffer 32 and then output to a digital jack 36 or computer 34 for permanent storage and further statistical analyses.

In accordance with the method of the preferred embodiment of the invention, the micro device 24 under test is placed within the field of view of the optical lens system 19. The micro device 24 is then subjected to any external conditions under which the test is to be performed. For example, if the micro device under test is a semiconductor device, the semiconductor device may be subjected to a forward or reverse bias by an external power supply (not shown).

Still further in accordance with the preferred embodiment of the invention, the electromagnetic radiation emission from the micro device 24 passes through the optical window 20 to the chopper 21, and is thereby incident upon the apertured disc or circular blade 26 of the chopper 21. The chopper 21 is provided to periodically modulate the electromagnetic radiation of the micro device 24. The apertured disc or circular blade 26 of the chopper 21 is rotating at a fixed speed, driven by the precision electric motor 25. Because of the rotation, the apertured disc or circular blade 26 is periodically aligned and misaligned with the incident radiation, thus allowing periodic passage and causing periodic modulation of the incident radiation.

Still further in accordance with the method of the invention, the optical lens system 19 is arranged to focus the incident radiation that passes through the apertured disc or circular blade 26, onto the array detector 18. The focused radiation, however, is filtered by the bandpass filters 22 to filter that segment of the radiation having wavelengths greater than 5 micrometers. Moreover, the focused radiation is also filtered by the bandpass filters 22 to filter that segment of the radiation not within a narrow band. For example, the filters 22 may be selected to filter that segment of the radiation having wavelengths greater than 5 micrometers and less than 3 micrometers, as indicated by arrow 40 in FIG. 2.

That portion of the electromagnetic radiation emission that passes through the chopper 21 and is transmitted through the bandpass filters 22, is focused upon the array detector 18. Each detector element of the array detector 18 simultaneously generates a signal corresponding to the incident radiation focused thereupon. These signals are measured to generate information regarding the intensity and location of the electromagnetic radiation emission from the micro device 24 under test.

For example, the signals generated by the detector elements may be transformed into numeric data, corresponding to the radiation emission from a spatial location on the surface of the micro device 14, by the electronic signal processor 7. The numeric data is then displayed or permanently stored, as previously disclosed, for evaluation. Preferably, evaluation will include interpreting the numeric data to detect and locate defects in the micro device 24 under test. This is accomplished, for example, by a simple comparison of the numeric data corresponding to the micro device 24 under test to other known test data, or a theoretical model, to detect abnormalities. Applicant believes that by utilizing the method of the present invention, thermal differences in micro devices as low as 0.001 degree Centigrade can be detected.

It will be apparent to those skilled in the art that various modifications and variations can be made in the practice in the method the of the present invention without departing from the scope or spirit of the invention. As an example, it will be apparent to those skilled in the art that chopper assembly 21 could comprise a pulsating shutter instead of a rotating apertured disc or circular blade 26. Moreover, for example, it will be apparent to those skilled in the art that a closed cycle cooler can be substituted for dewar 10 and liquid nitrogen 11. Furthermore, the applicant believes that the present invention can be used generally to detect defects in any type of micro device that emits infrared radiation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of measuring thermal differences in electromagnetic radiation emission from a micro device, comprising the steps of:
   placing said micro device within a field of view of an optical lens system;
   providing an array detector having a plurality of detector elements;
   arranging said optical lens system to focus said electromagnetic radiation emission on said array detector;
   filtering said electromagnetic radiation focused on said array detector to substantially eliminate segments of said electromagnetic radiation emission with wavelengths greater than 5 micrometers; and
   measuring signals produced by each of said detector elements, said signals respectively corresponding to a portion of said electromagnetic radiation emission focused on each of said detector elements.

2. The method of claim 1, which further comprises the step of modulating said electromagnetic radiation emission to periodically interrupt said electromagnetic radiation emission focused on said array detector.

3. The method of claim 1, wherein said filtering step includes filtering said electromagnetic radiation focused on said array detector to substantially eliminate segments of said electromagnetic radiation emission with wavelengths greater than 5 micrometers and wavelengths less than 3 micrometers.

4. The method of claim 1, wherein said providing step includes providing an array detector selected from a group consisting of indium antimonide, mercury cadmium telluride, and platinum silicide array detectors.

5. The method of claim 4, wherein said arranging step includes arranging an optical lens system having a lens comprised of an optical material selected from a group consisting of zinc selenide, calcium fluoride, and zinc sulfide.

6. The method of claim 4, wherein said micro device is a semiconductor device.

7. The method of claim 4, wherein said micro device is a metal oxide semiconductor field-effect transistor.

8. The method of claim 6, wherein said measuring step includes the step of converting said signals produced by each of said detector elements into numeric data.

9. The method of claim 8, further comprising the step of interpreting said numeric data to detect and locate defects in said semiconductor device.

10. The method of claim 2, wherein said filtering step includes filtering said electromagnetic radiation focused on said array detector to substantially eliminate segments of said electromagnetic radiation emission with wavelengths greater than 5 micrometers and wavelengths less than 3 micrometers.

11. The method of claim 10, wherein said providing step includes providing an array detector selected from a group consisting of indium antimonide, mercury cadmium telluride, and platinum silicide array detectors.

12. The method of claim 11, wherein said arranging step includes arranging an optical lens system having a lens comprised of an optical material selected from a group consisting of zinc selenide, calcium fluoride, and zinc sulfide.

13. The method of claim 11, wherein said micro device is a semiconductor device.

14. The method of claim 11, wherein said micro device is a metal oxide semiconductor field-effect transistor.

15. The method of claim 13, wherein said measuring step includes the step of converting said signals produced by each of said detector elements into numeric data.

16. The method of claim 15, further comprising the step of interpreting said numeric data to detect and locate defects in said semiconductor device.

17. A method of measuring thermal differences in electromagnetic radiation emission from a semiconductor device, comprising the steps of:
  placing said semiconductor device within a field of view of an optical lens system;
  providing an indium antimonide array detector having a plurality of detector elements;
  arranging said optical lens system to focus said electromagnetic radiation emission on said indium antimonide array detector; and
  filtering said electromagnetic radiation focused on said indium antimonide array detector to substantially eliminate segments of said electromagnetic radiation emission focused on said indium antimonide array detector with wavelengths greater than 5 micrometers;
  modulating said electromagnetic radiation emission to periodically interrupt said electromagnetic radiation emission focused on said indium antimonide array detector; and
  measuring signals produced by each of said detector elements, said signals respectively corresponding to a portion of said electromagnetic radiation emission focused on each of said detector elements.

18. The method of claim 17, wherein said filtering step includes filtering said electromagnetic radiation focused on said indium antimonide array detector to substantially eliminate segments of said electromagnetic radiation emission focused on said indium antimonide array detector with wavelengths greater than 5 micrometers and wavelengths less than 3 micrometers.

19. The method of claim 18, wherein said measuring step includes the step of converting said signals produced by each of said detector elements into numeric data.

20. The method of claim 19, further comprising the step of interpreting said numeric data to detect and locate defects in said semiconductor device.

* * * * *